United States Patent [19]

Takada

[11] 4,312,539
[45] Jan. 26, 1982

[54] VEHICLE SEAT BELT GUIDE

[76] Inventor: Juichiro Takada, 3-12-1, Shinmachi Setagayaku, Tokyo, Japan

[21] Appl. No.: 109,983

[22] Filed: Jan. 7, 1980

[30] Foreign Application Priority Data

Mar. 17, 1979 [JP] Japan .................................. 54-30566

[51] Int. Cl.³ ............................................. A62B 35/00
[52] U.S. Cl. .................................. 297/468; 297/476; 297/483
[58] Field of Search ...................... 297/483, 468, 476; 24/136 K, 136 R, 115 M, 68 SB, 171, 183, 194, 196, 200; 280/808

[56] References Cited

U.S. PATENT DOCUMENTS

| | | | |
|---|---|---|---|
| 2,540,887 | 2/1951 | Hyatt | 24/115 M |
| 3,695,697 | 10/1972 | Stoffel | 24/171 X |
| 3,856,351 | 12/1974 | Garvey | 297/483 X |
| 3,929,351 | 12/1975 | Fricko | 297/483 X |
| 3,995,885 | 12/1976 | Plesniarski | 297/483 |
| 4,184,234 | 1/1980 | Anthony et al. | 24/171 X |
| 4,208,770 | 6/1980 | Takada | 24/136 K |
| 4,231,592 | 11/1980 | Scherenberg | 280/808 |
| 4,243,266 | 1/1981 | Anderson | 297/468 |

Primary Examiner—James T. McCall
Attorney, Agent, or Firm—Brumbaugh, Graves, Donohue & Raymond

[57] ABSTRACT

A belt guide for use in a vehicle occupant restraint belt system of the type which has a belt retractor that exerts a generally constant retracting force on the belt. The belt guide includes a frame having a passage for the belt, a guide roller located on the frame at a point adjacent to the passage and a belt clamping member mounted on the frame for movement between a release position out of engagement with the belt and a stop position in which the belt is clamped between the clamping member and either the belt guide roller or a portion of the passage in the frame. When the clamping member engages the belt in the stop position, the belt is prevented from being retracted.

5 Claims, 7 Drawing Figures

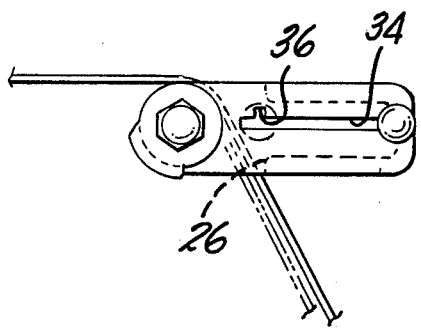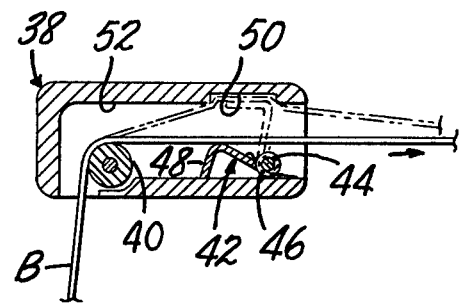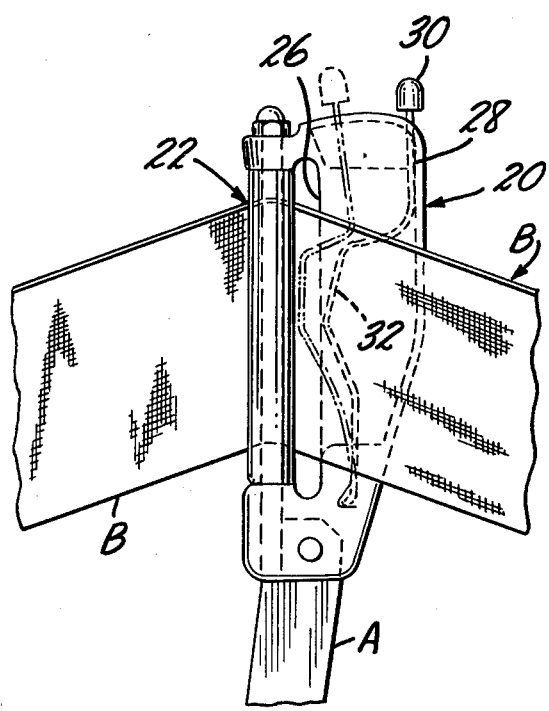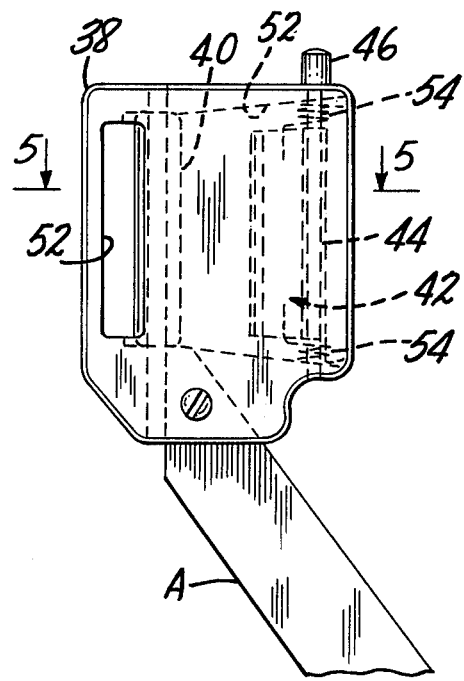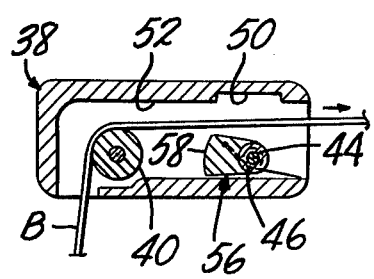

VEHICLE SEAT BELT GUIDE

FIELD OF THE INVENTION

The present invention relates to a seat belt guide that may be used in vehicle occupant restraint belt systems of the type having a belt retractor that exerts a substantially constant retracting force on the belt and, in particular, to a seat belt guide which is interposed at a point along the path of the belt between the retractor and the passenger and which includes a locking device that the passenger can engage to prevent the belt from retracting so it does not pull against him (to his discomfort).

BACKGROUND OF THE INVENTION

Seat belts as passenger-restraining devices have come to be used universally to improve the safety of the occupants of vehicles. Although passenger restraint belt systems are arranged in various ways, nearly all systems have at least one belt which winds onto and unwinds from a belt retractor. For example, the belt retractor may be employed in a two-point type belt system in which a fixed end of the belt is secured to either the lower portion of the vehicle on the inboard side of the seat of the upper portion of the vehicle on the outboard side. In the first instance the retractor is secured to the vehicle adjacent to the seat on the outboard side, while in the latter case the retractor is disposed next to the seat on the inboard side. In a three-point type belt system the respective ends of a single continuous lap and shoulder belt are anchored to upper and lower portions of the vehicle on the outboard side of the seat. A control belt is attached at one end to guide a ring which receives the intermediate portion of the continous belt and winds onto and unwinds from a retractor located adjacent to the seat on the inboard side.

In most restraint belt systems the retractor exerts a constant belt-winding force on the belt, thereby automatically and continuously adjusting the belt system to fit the individual passenger. An undesirable aspect of the adjusting feature provided by a continuously working retractor, however, is the constant pressure of the tensioned restraint belt (or belts) exerted on the passenger.

In the case of a waist or lap restraint belt (which extends from side to side over the lower part of the vehicle seat) the passenger becomes locally uncomfortable over the length of the retractor belt which is constantly pressed against the mid-section of his or her body. Similarly, the passenger subjected to a shoulder belt extending diagonally across his or her upper body experiences the uncomfortable feeling of being continually pulled toward the seat back. In order to increase the use of seat belt restraint systems, it is desirable to make them as comfortable as possible and eliminate all undesirable characteristics such as the uncomfortable retracting force described above.

It is, therefore, an object of the present invention to provide a seat belt guide for use in vehicle seat belt restraint systems which is capable of clamping a restraint belt and locking it against retraction while in use, thereby eliminating the discomfort normally associated with wearing a constantly tensioned restraint belt.

It is a further object of the present invention to provide a seat belt guide as described above on a pivotable support arm which is pivotably connected to the side of a seat and is linked to a mounting bracket for a pivotable seat back so that when the seat back is pivoted forward, the seat belt is prevented from being clamped between the seat and the seat back.

SUMMARY OF THE INVENTION

In accordance with the present invention there is provided a belt guide for a vehicle occupant restraint belt system of the type having a belt retractor which exerts a generally constant retracting force on the belt. The belt guide includes a frame which has a passage for guiding the belt, a belt-turning guide roller mounted for rotation on the frame adjacent to the passage and engaging the belt generally transversely, and a belt clamping member mounted on the frame for movement between a release position out of engagement with the belt and a stop position in which the clamping member clamps the belt against either the belt guide roller or a portion of the passage. When the clamping member is in the stop position, the belt is prevented from retracting.

In one embodiment of the invention the belt clamping member is a resilient arm pivotably mounted at one end of the belt guide frame and having a center portion positioned to clamp the belt against the guide roller and an upper portion which is received in an elongated slot in the top of the frame. A latching offset portion of the slot retains the clamping member in a position in which the belt is resiliently clamped between the center portion of the arm and the guide roller.

In another embodiment the belt guide has a manually-operated clamping member mounted to pivot on the frame about an axis spaced from and transverse to the belt passage. A clamping surface on the member clamps the belt against the frame when the clamping member is in the stop position. A spring urges the clamping member toward the release position.

The belt guide may be used in conjunction with a vehicle seat having a folding back which is connected by means of pivotable mounting brackets to the sides of the lower rear of the seat bottom. The belt guide frame in this configuration is secured to the upper end of a support arm which is pivotably attached at its lower end to the side of a seat. The support arm is cooperatively connected to a mounting bracket by means of a link so that the support arm pivots forward when the seat back is pivoted forward.

As a result of the seat belt guide embodying the present invention seat belt restraint systems which have a retracting belt that exerts a constant retracting force are improved by removing the pressure of the tensioned belt that is otherwise continually exerted on the passenger while the belt system is in use. This improvement adds to the comfort of and, thereby, promotes the usage of a belt restraint system—an extremely desirable result which contributes to the safety of vehicle occupant. Furthermore, the present invention provides that improvement by a device of simple construction which is easy to use and is of modest cost.

BRIEF DESCRIPTION OF THE DRAWINGS

FIG. 3 is a top view of a belt clamp useful in either of the arrangements of FIGS. 1 or 2;

FIG. 4 is a side elevational view of the belt clamp shown in FIG. 3;

FIG. 5 is a top cross-sectional view of another belt clamp taken along the lines 5—5 of FIG. 6;

FIG. 6 is a side elevational view of the belt clamp shown in FIG. 5; and

FIG. 7 is a top cross-sectional view of another belt clamp embodying the present inventions.

DESCRIPTION OF THE EMBODIMENTS

Figure 1:
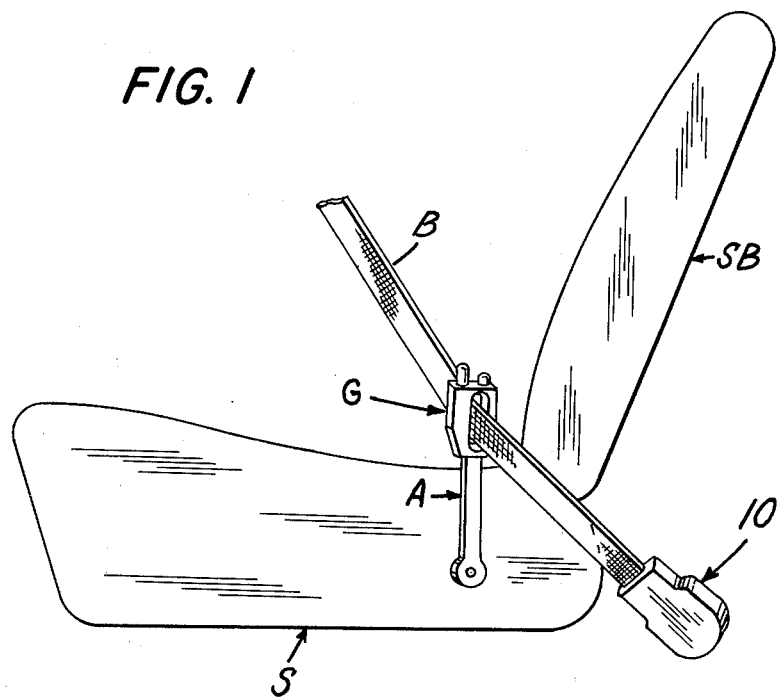
FIG. 1 is a side elevational view of an embodiment of the present invention as it may be used in a typical restraint belt system.

The restraint belt system shown in FIG. 1 comprises a belt B which leads from a retractor 10 installed generally behind and inboard of the vehicle seat S, such as by bolting to a frame member of the vehicle under the floor, to and through a belt guide G embodying the present invention. From the foregoing discussion, it should be understood that the belt B may be a lap or waist belt which leads across the lower portion of the seat S to an anchor or buckle located below, rearwardly and outboard of the seat A, a shoulder belt which leads upwardly and outwardly across the seat to an anchor or buckle generally above, behind and outboard of the seat back or a control belt used in association with a three-point belt system which includes a lap belt and a shoulder belt. In each case, the retractor 10 winds the belt B onto the retractor reel under a generally constant force. But for the belt guide G embodying the present invention, the restraint belt (lap, shoulder, or both) is continuously pulled against the body of the vehicle occupant, and the pressure of the belt causes discomfort to the occupant. In the past, many people have been reluctant to use restraint belts because of the uncomfortable pressure. In the restraint belt system shown in FIG. 1, the belt guide G is mounted on the upper end of a supporting arm A which is bolted or otherwise suitably fastened to the lower, rearward, inboard portion of the seat S. Examples of the belt guide G are shown in FIGS. 3 to 7 and described below.

Figure 2:
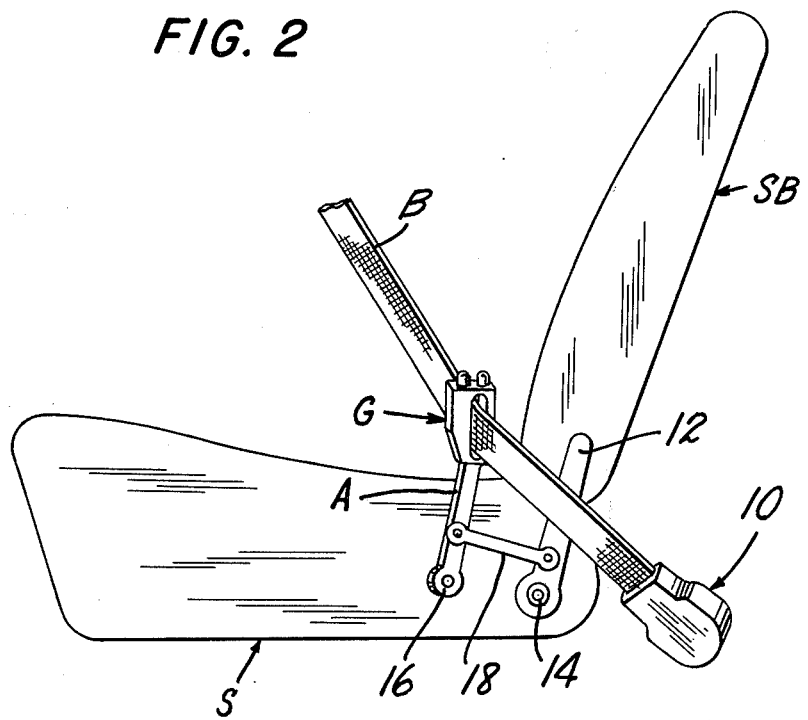
FIG. 2 is a side elevational view of another embodiment of the present invention.

Although the restraint belt system shown in FIG. 1 is suitable for a vehicle seat in which the seat back folds forward to allow access to the rear seat of the vehicle, the restraint system shown in FIG. 2 has the advantage of reducing or eliminating interference between the belt B and a seat back SB which folds or pivots forward by means of support brackets 12 fastened by pivot mountings 14 at the rear and on either side of the seat. The belt guide mounting arm A is connected to the side of the seat S by a pivot mounting 16 and is coupled to the inboard seat back mounting bracket 12 by a link 18 which is pivotably attached to the bracket 12 and the mounting arm A above the pivot mountings 14 and 16. When the seat back is tilted forward, the motion of the bracket 12 is transmitted by the link 18 to the mounting arm A, and the arm A and the belt guide G pivot forward and move the belt B out of the way of the seat back SB. The arrangement of FIG. 2 eliminates (or at least substantially reduces) wear on the belt and the seat back due to the abrasion that occurs where they rub against each other and eliminates (or minimizes) interference by the belt B with full forward folding of the seat back SB.

The embodiment of the belt guide shown in FIGS. 3 and 4 comprises a frame 20 which carries a rotatable guide roller 22 that lies generally transversely of the belt B. The incoming portion 24 of the belt (i.e., the portion leading to the guide from the retractor) turns around the guide roller 22 and passes through a guide passage 26 through the frame 20. A belt clamping member 28 in the form of a resilient metal strip having an operating button 30 at its upper end is pivotably attached at its lower end to the frame for movement between a release position in which a projecting center portion 32 is retracted to a position clear of the passage 26 and a stop position in which the projecting center portion 32 clamps the belt against the guide roller 22 and keeps the belt from being wound onto the retractor. The upper end of the belt clamping member 28 passes through a control slot 34 at the top of the frame 20 which guides the clamping member between the release and lock positions. The slot 34 has an offset locking portion 36 which extends in a direction corresponding to the winding direction of the belt and which receives the clamping member 28 and holds it in the locked position.

Ordinarily, the resiliency of the clamping member 28, in association with the pivot mounting, which biases the clamping member toward the release position, keeps the clamping member in the release position (solid lines in FIGS. 3 and 4) so that the belt B is normally subject to being rewound onto the retractor. If the occupant is uncomfortable because of the pressure of the belt against his body, he can lock the belt against rewinding by grasping the operating button 30 on top of the clamping member 28 and pushing rearwardly and then outwardly so that the clamping member 28 enters the locking offset portion 36 of the control slot 34 and is held in the locked position. If the belt is locked by the clamping member of the belt guide and is pulled out in the unwinding direction, the force which pulls it out will unseat the clamping member from the locking portion 36 of the control slot, and the clamping member will be restored to the release position.

The embodiment of FIGS. 5 and 6 includes a frame 38 connected to the top of the support arm A and carrying a rotatable guide roller 40. A clamping member—an "L" shaped plate 42—is pivotably mounted to the frame 38 by means of pin 44 and may be manually pivoted to a stop position by means of knob 46. The clamping member 42 has a clamping surface 48 which clamps the belt against a portion 50 of the interior wall of passage 52. Springs 54 are provided between the clamping member 42 and the frame 38 which urge the clamping member to a release position in which the clamping surface is out of contact with the belt. As in the embodiment previously described, the occupant may lock the belt against rewinding to relieve himself of the pressure of the belt against his body. In this configuration, however, the belt is locked by merely turning the knob 46 in a clockwise direction thereby clamping the belt between the clamping surface 48 and the part of the interior wall 50 (dotted lines in FIG. 5). To release the clamping member from this "stop" position, the belt need only be pulled in the unwinding direction enough to unseat the clamping surface from its engagement of the belt against the passage wall allowing the springs 54 to pivotably force the clamping member to the release position—against the passage wall (solid lines in FIG. 5).

A further modification which may be made to the embodiment shown in FIGS. 5 and 6 is shown in FIG. 7. All parts of the belt guide in FIG. 7 are exactly the same as those in FIGS. 5 and 6 and are identically numbered, except for clamping member 56 which is an elongated cylinder having a cam-shaped cross-section. The clamping surface 58 in this variation of the clamping member is the surface defining the widest end of the cam-shaped cross-section. The method of clamping and the mode of operation are the same as hereinbefore described in regards to FIGS. 5 and 6.

While there have been described what are believed to be the preferred embodiments of the invention, those skilled in the art will realize that changes and modifications may be made thereto without departing from the spirit of the invention, and it is intended to claim all such changes and modifications as fall within the true scope of the invention.

I claim:

1. A belt guide for a vehicle occupant restraint belt system of the type having a belt retractor which exerts a generally constant retracting force on the belt comprising a frame having a passage for guiding the belt, a belt-turning guide roller mounted on the frame for rotation adjacent the passage and engaging the belt generally transversely, and a belt clamping member mounted on the frame for movement between a release position out of engagement with the belt and a stop position in which the clamping member clamps the belt against one of said belt guide roller and a portion of said passage to prevent retraction of the belt, wherein the belt clamping member includes a resilient arm having a lower end pivotably supported by the frame, a center portion positioned to clamp the belt against the guide roller and an upper portion received in an elongated guide slot in the top of the frame, the slot having a latching offset portion for retaining the clamping member in a position in which the belt is resiliently clamped between the center portion of the clamping member and the guide roller.

2. A belt guide for a vehicle occupant restraint belt system of the type having a belt retractor which exerts a generally constant retracting force on the belt comprising a frame having a passage for guiding the belt, a belt-turning guide roller mounted on the frame for rotation adjacent the passage and engaging the belt generally transversely, and a belt clamping member mounted on the frame for movement between a release position out of engagement with the belt and a stop position in which the clamping member clamps the belt against one of said belt guide roller and a portion of said passage to prevent retraction of the belt, wherein the clamping member is pivotably mounted on the frame to be manually pivoted on an axis spaced from and lying transverse to a surface defining the belt passage and having a clamping surface located to clamp the belt against the said passage surface when the member is in the stop position, and further comprising a spring engaged between the frame and the clamping member and urging the member toward the release position.

3. A belt guide according to either of claims 1 or 2 for use in conjunction with a vehicle seat having a folding back connected to the seat portion by a pivotable mounting bracket and further comprising a support arm carrying the frame at its upper end and pivotably attached at its lower end to the side of the seat, and a link pivotably connected to the bracket and the arm so that the support arm cooperatively pivots forward when the seat back is pivoted forward.

4. A belt guide according to claim 2 wherein the direction of movement of the clamping surface from the stop position to the release position corresponds to the unwinding direction of belt movement.

5. A belt guide according to claim 2 wherein said passage surface is a notch into which the clamping member tucks the belt.

* * * * *